US008458652B2

(12) United States Patent
Adir et al.

(10) Patent No.: US 8,458,652 B2
(45) Date of Patent: Jun. 4, 2013

(54) DEVICE, SYSTEM AND METHOD OF MODELING HOMOGENEOUS INFORMATION

(75) Inventors: Allon Adir, Kiryat Tivon (IL); Roy Emek, Tel Aviv (IL); Eitan Marcus, Haifa (IL); Gil Eliezer Shurek, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1741 days.

(21) Appl. No.: 11/677,589

(22) Filed: Feb. 22, 2007

(65) Prior Publication Data
US 2008/0208827 A1 Aug. 28, 2008

(51) Int. Cl.
*G06F 9/44* (2006.01)
(52) U.S. Cl.
USPC .......................................... 717/107
(58) Field of Classification Search
USPC ........................ 717/100, 104, 107
See application file for complete search history.

(56) References Cited

PUBLICATIONS

Singh, I. et al., Designing Web Services with the J2EE 1.4 Platform JAX-RPC, SOAP, and XML Technologies, Sun Microsystems, pp. 76-99 (2004).*
Ifergan, S., et al., Xeena, IBM (2004).*
Sampathkumar, N., Using the XSD Inference Utility, MSDN (2003).*
Skonnard, A., Understanding XML Schema, MSDN (2003).*
Alschuler, L., New XML Tools on IBM Alphaworks Site, XML.com (1999).*
Final Technical Report of OODBTG Authors: The Object-Oriented Databases Task Group (OODBTG), Prepared by Database Systems Study Group (DBSSG). The DBSSG is one of the advisory groups to the Accredited Standards Committee X3 (ASC/X3), Standards Planning and Requirements Committee (SPARC), operating under the procedures of the American National Standards Institute (ANSI), Sep. 17, 1991.
Object Model Features Matrix, Authors: NCITS (National Committee for Information Technology Standards) Technical Committee H7, Published May 25, 1997.
S. Choudhury et al, "Graph object oriented model and query language: a semi-structured approach", Proceedings International Conference on Information Technology: Coding and Computing, 2001, p. 685-9.

* cited by examiner

*Primary Examiner* — Anna Deng
(74) *Attorney, Agent, or Firm* — Ziv Glazberg; Glazberg & Applbaum Co.

(57) ABSTRACT

Device, system and method of modeling homogeneous information. For example, a method that includes providing to a model-based application an input model including a refinable homogeneous record having a base type, wherein said homogeneous record is defined with a homogeneous constraint to only include data members of a type compatible with the base type. The homogeneous record is defined in a modeling environment that is able to automatically enforce the homogeneous constraint for the homogeneous record and for refinements thereof.

11 Claims, 5 Drawing Sheets

DEVICE, SYSTEM AND METHOD OF MODELING HOMOGENEOUS INFORMATION

FIELD

Some embodiments of the invention relate to representation of information in modeling languages for use in model-based applications.

BACKGROUND

In the field of information modeling and model-based application development, it may be useful to utilize structural commonality of objects in an application domain. This may be supported by a modeling language, for example, using structure or record types that include typed data members. Record types may be defined through a process of inheritance and refinement from an existing record type, where a derived record inherits all data members of the parent record and may further add new data members or refine the types of the inherited data members.

For example, in modeling a processor, instructions may be associated, among other attributes, with attributes that indicate resources that the instructions may access, e.g., data resources such as registers or memory. Those resources may be represented, for example, using record types, e.g., a "Resources" record type and/or refinements of that type. For example, a Load instruction may be modeled using the following code, denoted Code 1:

```
                           Code 1
meta type Resource: record { ... };         // defines the Resource
                                               meta-type
meta type Register: record Resource { ... };  // inherits from Resource
meta type Memory: record Resource { ... };    // inherits from Resource
meta type Instruction: record {
    resources: record { };                  // defines "resources" to be
                                               (empty) record type
};
type Load: record Instruction {             // inherits from Instruction
    resources: {                            // refines the inherited attribute
                                               "resources" to contain Load-specific
                                               resources
        target_register: Register;
        source_memory: Memory;
        base_register: Register;
    };
};
type LoadIndex: record Load {               // inherits properties from Load
    resources: {                            // refines the inherited attribute
                                               "resources" to contain
                                               LoadIndex-specific resources
        index_register: Register;
    };
};
```

In Code 1, the "meta" keyword may be used to specify that the type defined is part of the meta-model. A conceptual model and/or a meta-model may provide a lexicon for a model-based application, including generic concepts, intended semantics, and other information regarding the structures and types used by the modeling language. For example, the meta-model for a processor may include the general notion of an instruction, e.g., the Instruction type of Code 1, since "instruction" is a concept common to all processors, whereas a specific instruction, e.g., the Load type of Code 1, may be specific to a given processor design and may therefore part of the model, but not the meta-model.

Unfortunately, if Code 1 is used, then a modeler may need to manually enforce any integrity constraint, for example, requiring that all subcomponents (e.g., target_register in the Load record) be of the "Resource" type. This may be error-prone, and may also affect model-based applications which access or operate on information contained in the model (e.g., the Load instruction) based only on their knowledge of the meta-model (e.g., Instruction, and not Load). For example, an application may determine, based on the meta-model, that all instructions (including Load instructions, which inherit from the Instruction meta-type) have resources, so it may be necessary for the modeler to ensure this constraint, i.e., that the Load instruction actually contains resources of the correct type.

Alternatively, some modeling languages may utilize maps to enforce types, for example, as demonstrated in the following code, denoted Code 2:

```
                           Code 2
meta type Instruction: record {
    resources: map<string, Resource>   // defines "resources" to
                                          be a map type between strings
                                          and Resources
};
type Load: record Instruction { };     // inherits from Instruction
```

In Code 2, the "resources" data member is defined as a map between strings and Resources, and thus any specific instance of the resources map may only include resources with values of the "Resource" type. Unfortunately, if Code 2 is used, it may still be required to restrict the resources map in the Load type to contain only the Load-related resources. Furthermore, to capture the intended modeling semantics, it may be necessary to associate specific resources (map keys) with specific Resource values, e.g., by instantiating the map. Accordingly, instead of utilizing a universal map from strings to resources, a specific map may be defined, for example, as demonstrated in the following code, denoted Code 3:

```
                           Code 3
type Load: record Instruction {           // inherits from Instruction
    resources: map<                       // refines the inherited attribute "resources"
        <"target_register", GeneralPurposeRegister>,
        <"source_memory", MainMemory>,
        <"base_register", GeneralPurposeRegister>
    >
};
```

In Code 3, the GeneralPurposeRegister and MainMemory types may be previously defined instances of the Register and Memory types, respectively. Unfortunately, utilization of a specific map as in Code 3 may represent the Load instruction as a particular instance of a load instruction rather than as a general Load type in the model, and thus may not allow for further refinement at the type level. For example, adding new entries into the map, e.g., a <"index_register", Register> entry for defining a "LoadIndex" instruction, violates the principles of refinement. Furthermore, the resources map in the Load instruction of Code 3 may only restrict an instance of the Load type to have a subset of the specified entries, but may not enforce all of the entries (e.g., an instance of the Load instruction type of Code 3 may have a target register and a base register, but no source memory), which violates the intended semantics.

The foregoing examples of the related art and limitations related therewith are intended to be illustrative and not exclusive. Other limitations of the related art will become apparent to those of skill in the art upon a reading of the specification and a study of the figures.

SUMMARY

Some embodiments of the invention may include, for example, devices, systems and methods of modeling homogeneous information.

In some embodiments, for example, a method of handling homogeneous information includes providing to a model-based application an input model including a refinable homogeneous record having a base type, wherein the homogeneous record is defined with a homogeneous constraint to only include data members of a type compatible with the base type. The method may further include automatically enforcing the homogeneous constraint for the homogeneous record and for a refinement of the homogeneous record Some embodiments may provide, for example an apparatus including a modeling environment to create a model including a refinable homogeneous record having a base type, wherein the homogeneous record is associated with a homogeneous constraint that allows the homogeneous record to only include data members of one or more types compatible with the base type. Further, in some embodiments the modeling environment is able to automatically enforce the homogeneous constraint for the homogeneous record and for refinements of the homogeneous record.

In some embodiments, refinements of a homogeneous record may include one or more of: refinement of base type of the homogeneous record; refinement of one or more data members of the homogeneous record; and/or addition of one or more data members to the homogeneous record.

Some embodiments may provide, for example a system including a model-based application to receive an input model including a homogeneous record having one or more data members of a compatible type, and to determine a base type of the homogeneous record. Further, in some embodiments, the model-based application is to operate on the data members of the homogeneous record based on said base type.

In some embodiments, the model-based application includes a test generator, and the input model describes a processor and instructions that the processor is able to execute.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. Moreover, some of the blocks depicted in the drawings may be combined into a single function.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion. It is intended that the embodiments and figures disclosed herein be considered illustrative rather than restrictive.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, a plurality of data members may include two or more data members.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language or modeling language. It will be appreciated that a variety of modeling languages and/or programming languages may be used to implement the teachings of the inventions as described herein.

As an overview, some embodiments of the invention may allow defining structures that contain homogeneous subcomponents of a given base type, for example, records whose data members are of the base type or a refinement of the base type. Accordingly, homogeneous records may be added as a new modeling construct in a modeling language. When defining the homogeneous record, a modeler may be required to specify a base type of the record, and all the data members contained in the record may be either of the base type or a refinement of the base type. As used herein, the term "base type" may refer to a type that is the basis for a homogeneous constraint associated with the homogeneous record, such that data members of the homogeneous record are type-compatible with the base type. Thus, the term "base type" as used herein is not limited to a parent type from which other types may be derived, and may also refer to types derived and/or refined from a parent base type.

Furthermore, a homogeneous record may be refined to derive a new record that is also homogeneous. Some embodiments may provide, for example, refine-able homogeneous collections and/or refine-able records, where refine-able or "refinable" includes both refinements of the types associated with the collection or record and the refinement or addition of further members in type form. For example, new homogeneous records may be derived through inheritance and refinement, for example, by adding one or more new data members that are type-compatible with the base type, refining the type of an existing data member, and/or refining the base type of the original homogeneous record.

In accordance with some embodiments of the invention, a modeling language or environment may substantially automatically enforce the integrity of a "homogeneous constraint", i.e., that all data members of a homogeneous record or of any refinement thereof belong to one or more types that are either the base type or a refinement of the base type. Furthermore, substantially any application that traverses the model may be able to access all data members of a homogeneous record and may safely operate on the data members based on the knowledge that all data members of the homogeneous record are of the base type or a refinement of that type. In some embodiments, an application may utilize a reflection mechanism to determine whether a record is homogeneous and may further determine the base type of the homogeneous record. In other embodiments, a model-based application may utilize structural information provided by a meta-model, e.g., a homogeneous constraint and base type of a homogeneous record, to process the input model in a more sophisticated manner. Accordingly, knowing that a record is homogeneous and knowing the base type of the homogeneous record may be useful information, e.g., to a user trying to understand the model, as well as to a model-based application that can operate based on this information.

Embodiments of the invention are described herein in the context of handling refinable homogeneous records. However, it will be appreciated by persons skilled in the art that aspects of the invention may also be used for handling data collections, for example, vectors, maps, sets and/or any other data structures.

Figure 1:
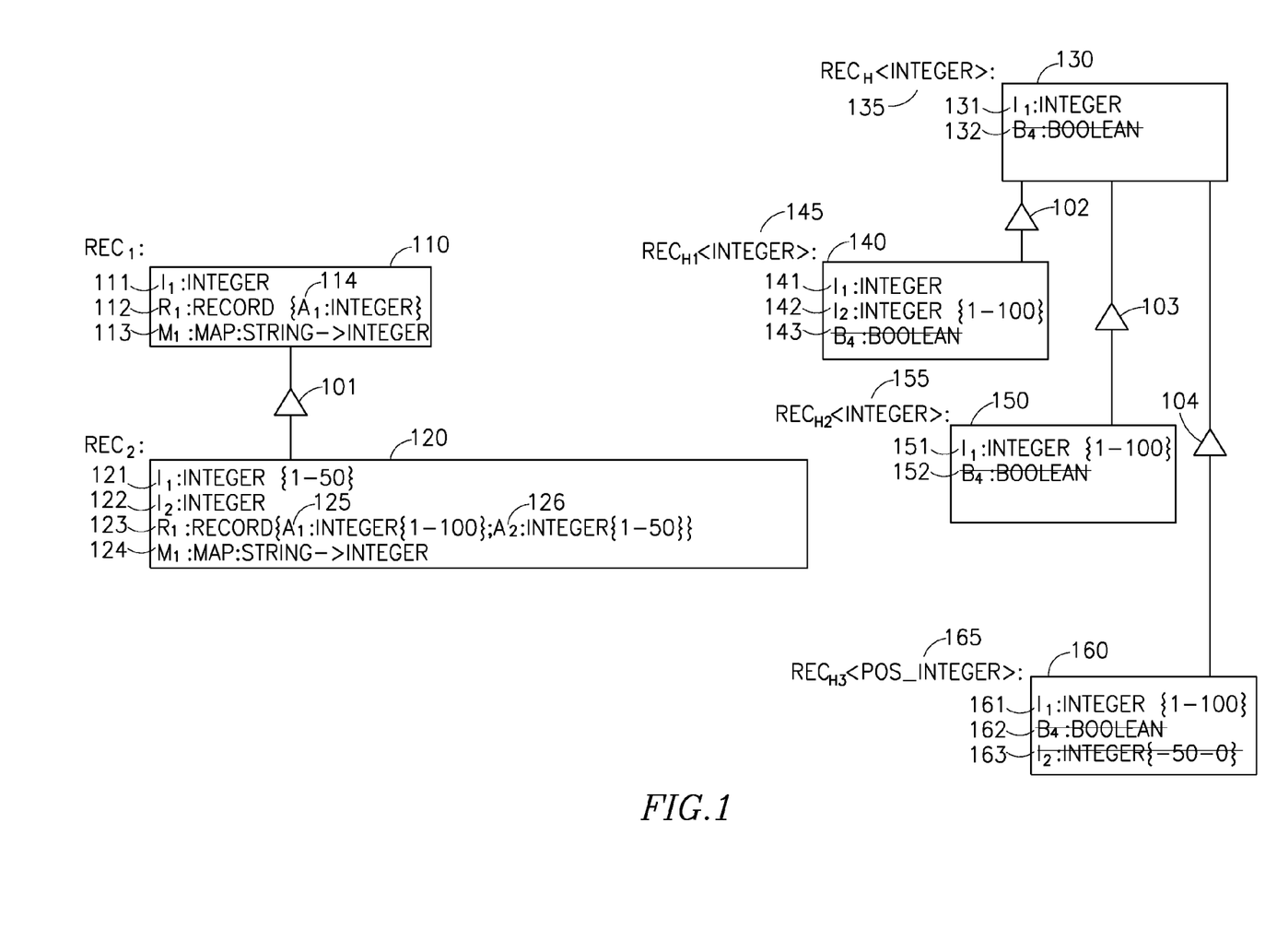
FIG. 1 is a schematic block diagram illustration of homogeneous and non-homogeneous data structures in accordance with a demonstrative embodiment of the invention.

Reference is made to FIG. 1, which schematically illustrates homogeneous and non-homogeneous data structures in accordance with a demonstrative embodiment of the invention. Although embodiments of the invention are not limited to these examples, FIG. 1 shows two examples of a record data structure, namely, records 110 ($REC_1$) and 130 ($REC_H$), as well as several refinements of those records. In accordance with some embodiments of the invention, record 130 and its refinements may be homogeneous records, whereas record 110 and its refinements may be non-homogeneous records.

In accordance with embodiments of the invention, a record data structure is defined to contain at least the data members of the types specified therein, and any derived record of the original record may further include additional data members, or may refine the types of the inherited data members. For example, an empty record may be considered the most general record type, from which all other records are derived. Thus, record types may be useful for exploiting the structural commonality of objects in the modeling domain. Furthermore, in accordance with demonstrative embodiments of the invention, a record may be declared as homogeneous, i.e., where all the data members must be of the base type or a refinement of the base type, and where refinements of the homogeneous record must also follow the homogeneous constraint.

In this example, record 110 ($REC_1$) includes data members 111-113, where data member 111 ($I_1$) is an integer type, data member 112 ($R_1$) is a record type that includes an integer data member 114 ($A_1$), and data member 113 ($M_1$) is a map type between strings and integers. In this example, record 110 is a non-homogeneous record, since its data members belong to different, non-compatible types.

As indicated by symbol 101, record 120 ($REC_2$) is derived from record 110 through inheritance and refinement. In this example, record 120 includes an inherited integer data member 121 ($I_1$) of refined domain (compared to data member 111); a new integer data member 122 ($I_2$); a record data member 123 ($R_1$), which is a refinement of the record type 112; and an inherited map type data member 124 ($M_1$). Record data member 123 includes integer data members 125 ($A_1$) and 126 ($A_2$), where data member 125 is a refinement of data member 114, and data member 126 is a new data member. In this example, although record 120 ($REC_2$) is a non-homogeneous record type, its data member record 123 ($R_1$) may have data members of the same type, e.g., data members 125 and 126, which are both integer types. However, record 123 is not declared to be a homogeneous record type and therefore there is no restriction to prevent, for example, defining a new record $REC_3$ which inherits from $REC_2$ and which adds a new, non-integer, data member to the record $R_1$.

In accordance with embodiments of the invention, record 130 ($REC_H$) may be defined as a homogeneous record type where all data members are of one or more types that are either the base type or some refinement of the base type, and thus compatible. In this example, record 130 is defined with the integer base type, e.g., as indicated by the angle brackets 135: "$REC_H$<INTEGER>", and includes an integer-type data member 131 ($I_1$). In contrast to the non-homogeneous records discussed above, homogeneous record 130 may not include an additional data member 132, e.g., of the Boolean type, since data member 132 would not be type-compatible with the declared base type of the homogeneous record. In addition, homogeneous record 130 may be refinable, e.g., by adding one or more new data members that are type-compatible with the base type, by refining the type of an existing data member, or by refining the base type. A record that is derived from a homogeneous record may also be homogeneous.

Record 140 ($REC_{H1}$) may be a homogeneous record derived from record 130, in accordance with some embodiments of the invention. As indicated by symbol 102, record 140 may inherit all data members from record 130, e.g., the integer-type data member 141 ($I_1$). In addition, record 140 may refine the homogeneous record 130 by adding a new data member, e.g., an additional integer-type data member 142 ($I_2$). In accordance with embodiments of the invention, the refined record 140 may also be homogeneous with the integer base type, e.g., as indicated at 145, and therefore may not include a Boolean-type data member 143.

Record 150 ($REC_{H2}$) may also be a homogeneous record derived from record 130, in accordance with some embodiments of the invention. As indicated by symbol 103, record 150 may inherit all data members from record 130, e.g., the integer-type data member 151 ($I_1$). In addition, record 150 may refine the homogeneous record 130 by refining the type of the inherited data member 151, e.g., by restricting the domain to integers from 1 to 100. In accordance with embodiments of the invention, the refined record 150 may also be homogeneous with the integer base type, e.g., as indicated at 155, and therefore may not include a Boolean-type data member 152.

Record 160 ($REC_{H3}$) may also be a homogeneous record derived from record 130, in accordance with some embodiments of the invention. As indicated by symbol 104, record 160 may inherit all data members from record 130, e.g., the integer-type data member 161 ($I_1$). In addition, record 160 may refine the homogeneous record 130 by refining the base type 165, e.g., by restricting the domain from integers to positive integers. In accordance with embodiments of the invention, the refined record 160 may also be homogeneous with a refined base type. Thus, the refined homogeneous record 160 may not include a Boolean-type data member 162, but may further not include a non-positive integer data member 163, since non-positive integers would not be compatible with the refined base type 165.

It is noted that the demonstrative examples above are presented for illustrative purposes, and that actual data records may include additional or other fields, types, data members or other items suitable for representing various structures.

Figure 2:
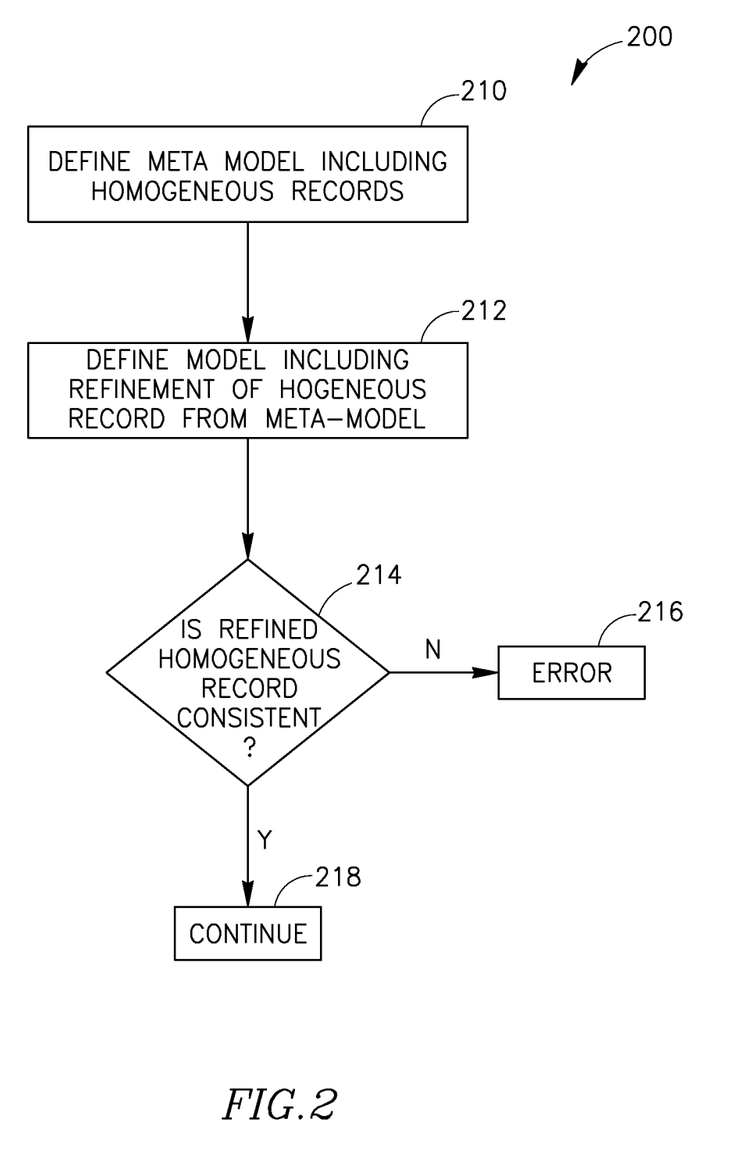
FIG. 2 is a schematic flow-chart of a method of representing and handling homogeneous information in accordance with a demonstrative embodiment of the invention.

Reference is made to FIG. 2, which schematically illustrates a flow-chart of a method 200 of representing and handling homogeneous information in accordance with a demonstrative embodiment of the invention. As demonstrated in the method of FIG. 2, a modeling environment may enforce type integrity in the homogeneous record, for example, by generating an error signal if non-compatible types are detected.

As indicated at block 210, the method may include, for example, defining a meta-model which includes one or more homogeneous records. For example, when defining a homogeneous record, a modeler may declare a base type of the homogeneous record. As indicated at block 212, method 200 may further include, for example, refining the homogeneous records, e.g., to define a specific model of a system or design. For example, a homogeneous record may be refined by adding new data members, which may be type-compatible with the declared base type. In some embodiments, the refinement of homogeneous records by adding new data members may be efficiently utilized by modelers.

As indicated at block 214, method 200 may include, for example, a checking mechanism (e.g., by the modeling language and/or modeling environment) to determine whether the homogeneous record or the refined homogeneous record is consistent. For example, the modeling environment may produce an error (block 216) if the refined structure is not properly defined; in contrast, the method may continue (block 218) if the integrity check is passed, e.g., allowing the modeler to proceed. Accordingly, some demonstrative embodiments of the invention may provide automatic enforcement of homogeneous types.

For example, in accordance with demonstrative embodiments of the invention, instructions in a modeled processor may enforce a homogeneous constraint requiring that all resources be compatible, e.g., even when defined in derived records, for example, as demonstrated in the following code, denoted Code 4:

```
Code 4 meta type Resource: record { address: integer; ... };
meta type Register: record Resource { ... };    // inherits from Resource
meta type Memory: record Resource { ... };      // inherits from Resource
meta type Instruction: record {
    resources: record<Resource>{ };    // defines "resources" to
                                       be (empty) homogeneous
                                       record type
};
type Load: record Instruction {        // inherits from Instruction
    resources: {                       // refines the inherited attribute
                                          "resources" to contain
                                          Load-specific resources
        target_register: Register;
        source_memory: Memory;
        base_register: Register;
    };
};
type LoadIndex: record Load {          // inherits from Load
    resources: {                       // refines the inherited attribute
                                          resources to contain
                                          LoadIndex-specific resources
        index_register: Register;
    };
};
type FixedPointInstruction: record Instruction {  // inherits from
                                                     Instruction
    resources: record<Register>{ }     // refines the inherited
                                          attribute "resources" to
                                          contain only Register-
                                          type resources
    };
};
```

In particular, the fifth line in Code 4 defines "resources" in the Instruction record to be an empty homogenous record type with a base type of "Resource". In accordance with embodiments of the invention, the Instruction record type states that all data members contained in its resources record must be of type Resource, but it is permissible to have data members of a type that is a refinement of Resource: for example, Memory and Register types as shown in Code 4 with reference to Load-specific resources.

As demonstrated in Code 4, the homogeneous resources record may be refinable in accordance with embodiments of the invention. For example, new data members may be added, e.g., as shown in the LoadIndex resources record; the types of the inherited data members may be refined; or the base type of the homogeneous record may be refined, e.g., as shown in the FixedPointInstruction resources record. In the refined type FixedPointInstruction, the homogeneous constraint may require that all data members of the resources record be compatible with the Register base type, and thus a Memory-type resource may not be permitted.

In accordance with embodiments of the invention, the integrity of the constraint that all data members of the homogeneous record "resources" must be of type Resource (or of a refinement of Resource), may be automatically enforced by the modeling language and/or the modeling environment. Furthermore, any application that traverses the model may access all included resources of any instruction, and may safely assume that they are type-compatible with Resource. Accordingly, if the type Resource has a particular property, e.g., an address, it is safe to access the address of any data member of the homogeneous "resources" record.

Figure 3:
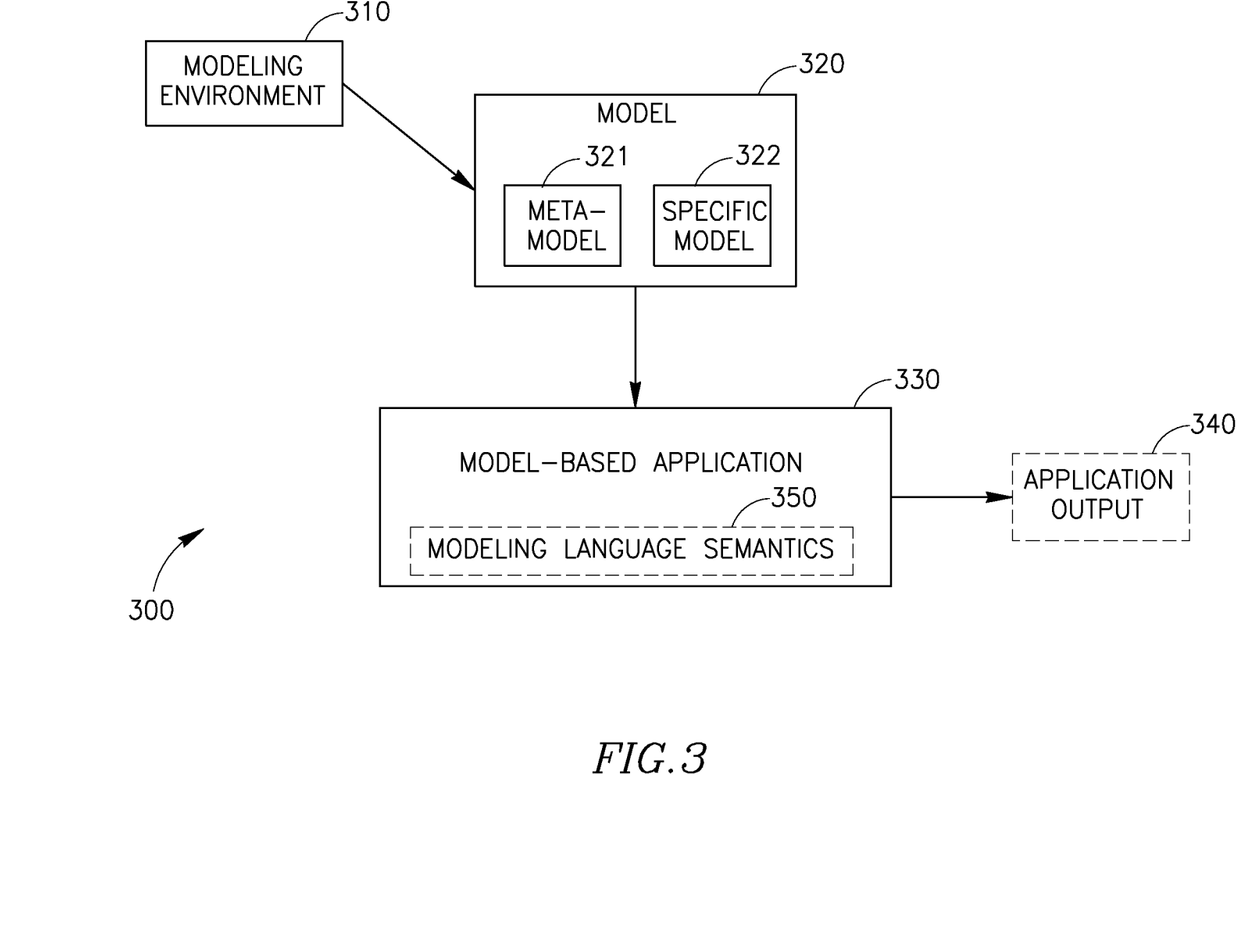
FIG. 3 is a schematic block diagram illustration of a system including a model-based application in accordance with a demonstrative embodiment of the invention.

Reference is made to FIG. 3, which schematically illustrates a block diagram of a system 300 implementing a model-based application 330 in accordance with a demonstrative embodiment of the invention. System 300 may include, for example, a modeling environment 310, a model 320, a model-based application 330, and, in some cases, application output 340. In some embodiments, the model-based application 330 may be or may include, for example, a test generator, a stimuli generator, a design verification system, a configuration system, or the like. In other embodiments, for example, model-based application 330 may be included in a configuration system and may generate a desired configuration 340 based on an input model 320 of a system to be configured.

The modeling environment 310 may be used to define the model 320, e.g., using method 200 of FIG. 2. For example, the model 320 may be a model of a system or design, and may include a meta-model 321, e.g., to define general structures, and a specific model 322, e.g., a design-specific part of the model where structures from the meta-model may be refined to represent the particular system or design. The model-based application 330 may receive the model 320 as input, and may produce application output 340. Optionally, model-based application 330 may utilize modeling language semantics 350 and/or other information (e.g., hard-coded, stored in a memory unit, or the like) to operate on the input model and produce application output 340. In some embodiments, an interactive process may be performed between the input model 320 and the model-based application 330. For example, model-based application 330 may further access input model 320 during runtime, e.g., to extract additional information, for reflection, or the like.

Figure 4:
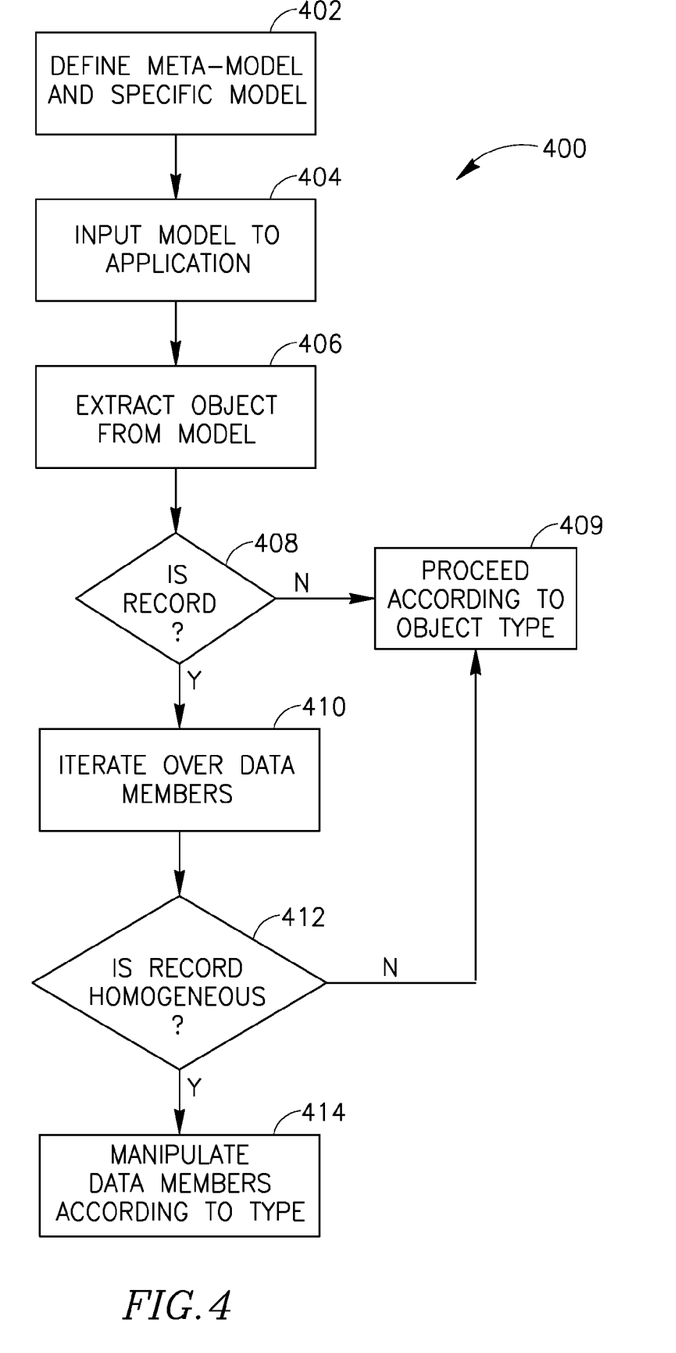
FIG. 4 is a schematic flow-chart of a method of applying an information model in accordance with a demonstrative embodiment of the invention.

Reference is made to FIG. 4, which schematically illustrates a flow-chart of a method 400 of applying an information model in accordance with a demonstrative embodiment of the invention. The method may be used, for example, in system 300 of FIG. 3 and/or in other model-based system or applications.

In some embodiments, method 400 may include, for example, defining a meta-model for a system-under-test and refining the meta-model to represent a specific design-under-test (block 402). For example, the model and/or meta-model may be defined using the modeling environment 310 of FIG. 3, e.g., as described above with reference to FIG. 2. In accordance with some embodiments of the invention, the system model may include one or more homogeneous structures, for example, a homogeneous record as described above with reference to FIG. 1.

As indicated at block 404, the system model may be transferred as input to a model-based application, e.g., the model-based application 330 of FIG. 3. In some embodiments, in addition to providing a formal representation of the system-under-test, the input model may optionally convey structural information regarding the types and objects defined in the model and/or the meta-model. For example, the additional structural information may be provided by an application programming interface (API) in a layer above the input model. The model-based application may access such information at runtime, e.g., using a reflection mechanism.

As indicated at block 406, method 400 may include, for example, extracting an object from the input model. For example, the model-based application may query the model for a particular object or structure, e.g., a particular type or instance of a type. As indicated at block 408, the method may include determining the type of the queried or extracted object. For example, if the object is a record, the method may include iterating (e.g., by the model-based application) over each data member of the record (block 410). If the object is not a record, the method may proceed in accordance with the object's type (block 409).

In accordance with embodiments of the invention, method 400 may further include a determination of whether the extracted object is a homogeneous record, e.g., as indicated at block 412. For example, the model-based application may recognize that a record is homogeneous based on its definition in the meta-model, e.g., since these may be included in the application's lexicon, or trough reflection. For example, some applications, e.g., a GUI application that provides a visual representation of the model, may not have access to and/or may not recognize the meta-model, but may still be able to determine that a record is homogeneous by reflection on the model. If the queried or extracted object is a homogenous record, then the method may include, for example, accessing and/or manipulating the data members in a type-safe manner (block 414). For example, if the base type of the homogeneous record is an integer type, the model-based application may safely perform integer-related operations, e.g., summation, on the data members without causing an error. As another example, a GUI application, upon determining that a record is homogeneous, may graphically represent the data members of the homogeneous record with the same or similar symbol, without having to further determine the type of each data member.

In contrast, if the queried object or structure is not a homogenous record, then the method may include, for example, utilizing using reflection to extract additional structural information from the input model in order to proceed (block 409), but may be limited in what could be done in a type-safe manner.

As demonstrated in the method of FIG. 4, a model-based application may receive a model having homogeneous records, and may efficiently utilize the fact that the model includes a homogeneous structure. Since the model-based application may have information of the semantics of the modeling language and/or the meta-model, the model-based application may recognize a homogeneous record upon accessing it. If the object is not a record, or is a record but not homogeneous, then the model-based application may continue (in a more limited manner) with a reflective process. In contrast, if the object is a homogeneous record, then the model-based application may iterate over the data members and access or manipulate those data members in accordance with the homogeneous type. For example, if the base type of the homogeneous record is integer, then the model-based application may safely perform integer arithmetic operations on any of its data members. In another example, if the base type of the homogeneous record is a Resource type, then the model-based application may safely access the resource's address without causing an error, knowing that all resources have addresses as defined in the meta-model.

Some embodiments, for example, may provide the model-based application with additional information, e.g., regarding allowed and/or non-allowed operations that the model-based application may not perform on a structure. The model-based application may access information contained in the model, for example, by querying the model for a particular object (e.g., a particular type or instance) through a property of the object (e.g., its name). Once the model-based application extracts the object, it may use reflection to extract further information about the object. In accordance with some embodiments of the invention, the model-based application may determine that it is allowed, or not allowed, to perform a particular operation with regard to that object, e.g., iterate over the data members of a record and access them in a type-safe manner, based on the fact that the object is homogenous.

Figure 5:
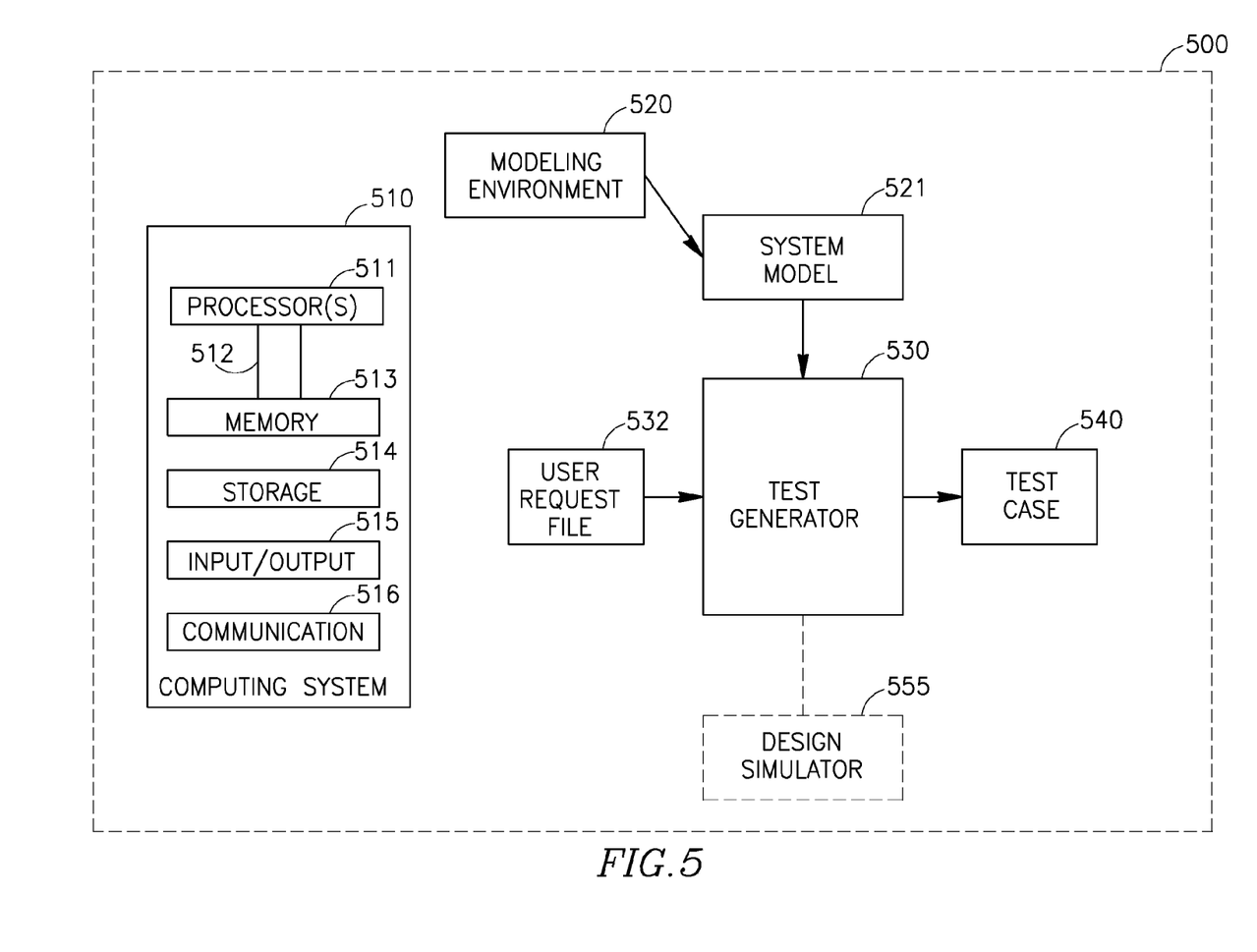
FIG. 5 is a schematic block diagram illustration of a system including a model-based application in accordance with another demonstrative embodiment of the invention.

Reference is made to FIG. 5, which schematically illustrates a system 500 including a model-based application 530 in accordance with a demonstrative embodiment of the invention. In some embodiments, for example, system 500 may be a design verification system or a hardware test system, and application 530 may be a test generator or a stimuli generator.

Model-based system 500 may optionally be implemented or may operate, for example, using a computing system 510, such as, for example, a computer, a personal computer (PC), a server computer, a computing device, a computing platform, a client/server system, a mobile computer, a portable computer, a laptop computer, a notebook computer, a tablet computer, or the like. Computing system 510 may include, for example, one or more processors 511, a system bus 512, a memory unit 513, a storage unit 514, an input/output unit 515, and a communication unit 516. Computing system 510 may optionally include other suitable hardware components and/or or software components.

In some embodiments, system 500 may be adapted to perform functional verification of a hardware and/or software system design, which may include objects that share a common structure, e.g., modeled with homogeneous records in accordance with demonstrative embodiments of the invention. A non-limiting list of hardware designs-under-test includes, for example, designs of a processor, a controller, a CPU, a DSP, a bus-bridge, a circuit, an integrated circuit, a direct memory access (DMA) controller, or the like. Software systems may include, for example, a configuration system for electronic components wherein the individual components of a system are modeled according to customer needs.

Accordingly, system 500 may include one or more hardware components and/or software components able to perform one or more operations of the functional verification process and produce suitable test cases 540. System 500 may include, for example, a model-based application 530 (e.g., a test generator), a modeling environment 520, a system model 521, an optional user input 532, and optionally a design simulator 555. The functional components of system 500 may be implemented using one or more computing systems 510.

The test generator 530 may be adapted to generate random or pseudo-random values used in the verification process and may include, for example, a test generator engine. Test generator 530 may optionally be adapted to receive a user input 532, e.g., a user request file, which may be utilized by an algorithm that generates test cases. For example, in hardware test generation, e.g., for a processor, the optional user requests may include a particular sequence of instructions to be included in the test case. System 500 may further include an abstract knowledge base adapted to store a formal description of the specification of the design-under-test, optionally including, for example, testing knowledge, testing constraints, testing coverage criteria, and/or other information. In some embodiments, the abstract knowledge base may be or may include, for example, a general and/or particularized model of the design-under-test, e.g., system model 521, and may optionally include testing knowledge that may be helpful in providing test coverage and/or biasing the testing process towards "interesting" test cases. In accordance with some embodiments of the invention, the system model 521 may be generated in a modeling environment 520, for example, as described above with reference to FIG. 2.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A compute-implemented method of handling homogeneous information, performed by a computerized device, the method comprising:

receiving by a model-based application an input model including a refinement record that is derived from a refinable homogeneous record having a base type, wherein said refinable homogeneous record is defined with a homogeneous constraint to only include data members of a type compatible with the base type, wherein the refinable homogenous record comprises a first set of data members, and wherein the refinement record comprises a second set of data members that comprises at least the first set of data members or a refinement of one or more data members of the first set of data members; and automatically enforcing said homogeneous constraint for the refinement record, wherein automatically enforcing comprises determining whether types of the second set data members are compatible with said base type, and generating an error signal if said types of second set data members are not compatible with said base type.

2. The method of claim 1, wherein the refinement record is derived from the refinable homogeneous record by an operation selected from a group of:
- a refinement of said base type of the refinable homogeneous record;
- introducing in the second set of data members a refinement of one or more data members included in the first set of data members; and
- including in the second set of data members one or more data members not included in the first set of data members, wherein each of the one or more data members not included in the first set of data members complies with the base type.

3. The method of claim 1, comprising applying reflection to extract structural information from the input model, said structural information comprising the homogeneous constraint and the base type of said refinable homogeneous record.

4. The method of claim 1, further comprising:
- based on the homogeneous constraint, automatically determining that a first type of operation is allowed to be performed on the first set of data members of said refinable homogeneous record, and that a second type of operation is disallowed to be performed on the first set of data members of said refinable homogeneous record.

5. The method of claim 4, comprising:
- automatically applying an operation of said first type of operation on a data member of the first set of data members of said refinable homogeneous record.

6. An apparatus having a processing unit and a storage device, the apparatus comprising:
- a modeling environment to create a model including a refinement record that is derived from a refinable homogeneous record having a base type,
  - wherein said refinable homogeneous record is associated with a homogeneous constraint that allows said refinable homogeneous record to only include data members of one or more types compatible with said base type, wherein the refinable homogenous record comprises a first set of data members, and wherein the refinement record comprises a second set of data members that comprises at least the first set of data members or a refinement of one or more data members of the first set of data members, and
- wherein the modeling environment is adapted to:
- automatically enforce said homogeneous constraint for said refinement record based on an examination of said second set of data members, and generating an error signal if types of said second set of data members are not compatible with said base type.

7. The apparatus of claim 6, wherein said one or more compatible types include said base type and refinements of said base type.

8. The apparatus of claim 6, wherein the refinement record is derived from the refinable homogeneous record by an operation selected from a group consisting of:
- a refinement of said base type of the homogeneous record;
- introducing in the second set of data members a refinement of one or more data members included in the first set of data members; and
- including in the second set of data members one or more data members not included in the first set of data members, wherein each of the one or more data members not included in the first set of data members complies with the base type.

9. The apparatus of claim 6, wherein the modeling environment is able to automatically determine whether a record is homogeneous or non-homogeneous.

10. The apparatus of claim 6, wherein the modeling environment is able to determine whether a record is homogeneous based on an examination of data members of said record and a comparison of one or more types of said data members of the record to said base type.

11. The apparatus of claim 6, wherein the modeling environment is able to determine whether or not a record in a model is homogeneous based on information stored in a meta-model associated with said model.

* * * * *